(12) United States Patent
Gunda et al.

(10) Patent No.: US 10,838,629 B2
(45) Date of Patent: Nov. 17, 2020

(54) SOLID STATE DEVICE WITH FAST BOOT AFTER UNGRACEFUL SHUTDOWN

(71) Applicant: Western Digital Technologies, Inc., San Jose, CA (US)

(72) Inventors: Sridhar Prudvi Raj Gunda, Bangalore (IN); Lalit Mohan Soni, Bangalore (IN); Vijaya Janarthanam, Bangalore (IN); Judah Gamliel Hahn, Ofra (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 234 days.

(21) Appl. No.: 16/140,163

(22) Filed: Sep. 24, 2018

(65) Prior Publication Data

US 2020/0097188 A1   Mar. 26, 2020

(51) Int. Cl.
*G06F 3/06* (2006.01)
*G06F 12/02* (2006.01)
*G06F 12/1009* (2016.01)
*G06F 9/4401* (2018.01)

(52) U.S. Cl.
CPC ............ *G06F 3/0617* (2013.01); *G06F 3/068* (2013.01); *G06F 3/0659* (2013.01); *G06F 9/4401* (2013.01); *G06F 12/0246* (2013.01); *G06F 12/1009* (2013.01)

(58) Field of Classification Search
CPC ...... G06F 3/0617; G06F 3/0659; G06F 3/068; G06F 9/4401; G06F 11/1417; G06F 12/0246; G06F 12/1009
See application file for complete search history.

(56) References Cited

U.S. PATENT DOCUMENTS

2014/0059275 A1 *   2/2014  Yun .................... G06F 12/0246
                                                                711/103

* cited by examiner

*Primary Examiner* — Aracelis Ruiz
(74) *Attorney, Agent, or Firm* — Loza & Loza, LLP; Gabriel Fitch (57) ABSTRACT

After an ungraceful shutdown (UGSD) event, a data storage apparatus restores a fast boot-up table from a copy stored in a non-volatile memory (NVM), and receives a first read command from a host. The first read command includes a request to read data from a logical block address (LBA). The apparatus maintains a fast boot-up table that includes a plurality of entries, and each entry includes an LBA and an associated physical block address of the NVM. If the LBA is contained in the fast boot-up table, the apparatus determines a first physical block address associated with the LBA using the fast boot-up table. The apparatus reads data from the NVM at the first physical block address, prior to completing an initialization process of the data storage apparatus, and transmits the data read from the NVM to the host.

25 Claims, 9 Drawing Sheets

SOLID STATE DEVICE WITH FAST BOOT AFTER UNGRACEFUL SHUTDOWN

TECHNICAL FIELD

The subject matter described herein relates to data storage devices incorporating non-volatile memory devices. More particularly, the subject matter described herein relates to a solid state device (SSD) capable of fast boot-up after ungraceful shutdown.

INTRODUCTION

In a variety of consumer electronics, SSDs (e.g., solid state devices) incorporating non-volatile memories are frequently replacing or supplementing conventional rotating hard disk drives for mass storage. These non-volatile memories may include one or more flash memory devices, such as NAND flash memory, and the flash memory devices or cells may be logically divided into blocks with each of the blocks further divided into logically addressable pages.

In a flash-based solid state device (SSD), data is typically programmed by pages and erased by blocks. Because a page cannot be directly overwritten without overwriting data in other pages within the same block, an SSD generally uses address indirection to manage the data stored in the flash memory. For example, an SSD controller may use a logical to physical (L2P) mapping system known as logical block addressing for mapping logical addresses to physical addresses. When an SSD receives new data that replaces older data already stored in the SSD, the SSD controller writes the new data to a new physical location (e.g., a new page) of the flash memory and updates the L2P mapping table such that the same logical address points to the new physical location. The SSD maintains an L2P mapping table that contains one entry for every logical block address (LBA) defined for the SSD's flash memory. Each entry in the L2P mapping table identifies the physical location (e.g., die, physical block, physical page) on which the corresponding logical block data is stored. The L2P mapping table may become quite large for an SSD with large capacity and is often held in volatile memory (e.g., dynamic random access memory or DRAM) accessible to the SSD controller, with a copy stored in non-volatile memory (NVM). The NVM is often implemented with flash memory. As the L2P mapping table is stored in volatile memory during normal operation, it must be restored when the SSD powers up, which can take a long time, due to the large size of the table. In particular, when the SSD is abruptly shut down (i.e., ungraceful shutdown), the copy of the L2P mapping table stored in the SSD NVM may not be correct.

SUMMARY

One aspect of the present disclosure provides a data storage apparatus. The data storage apparatus includes a non-volatile memory (NVM), a volatile memory, and a controller operatively coupled to the NVM and the volatile memory. The volatile memory is configured to store a fast boot-up table including a plurality of entries, each entry including a logical block address (LBA). After an ungraceful shutdown (UGSD) event of the data storage apparatus, the controller is configured to restore the fast boot-up table from a copy stored in the NVM. The controller further receives a first read command from a host via a host interface after the UGSD event. The controller locates an entry in the fast boot-up table having an LBA indicated by the first read command, and read data associated with the LBA from the NVM prior to completing an initialization process of the data storage apparatus. Then, the controller transmits the data read from the NVM to the host.

Another aspect of the present disclosure provides a method of operating a data storage apparatus including a non-volatile memory (NVM). The data storage apparatus restores a fast boot-up table from a copy stored in the NVM, after an ungraceful shutdown (UGSD) event of the data storage apparatus. The apparatus receives a first read command from a host after the UGSD event. The first read command includes a request to read data from a logical block address (LBA). The apparatus determines whether the LBA is contained in the fast boot-up table. The fast boot-up table includes a plurality of entries, and each entry has an LBA and an associated physical block address of the NVM. If the LBA is contained in the fast boot-up table, the apparatus determines a first physical block address associated with the LBA using the fast boot-up table. The apparatus reads data from the NVM at the first physical block address, prior to completing an initialization process of the data storage apparatus. Then the apparatus transmits the data read from the NVM to the host.

Another aspect of the present disclosure provides a data storage apparatus that includes a non-volatile memory (NVM). The data storage apparatus includes means for, after an ungraceful shutdown (UGSD) event of the data storage apparatus, restoring a fast boot-up table from a copy stored in the NVM. The fast boot-up table includes a plurality of entries, each entry comprising an LBA and an associated physical block address of the NVM. The data storage apparatus further includes means for receiving a first read command from a host after the UGSD event. The first read command includes a request to read data from a logical block address (LBA). The data storage apparatus further includes means for determining whether the LBA is contained in the fast boot-up table. The data storage apparatus further includes means for, if the LBA is contained in the fast boot-up table, determining a first physical block address associated with the LBA using the fast boot-up table. The data storage apparatus further includes means for reading data from the NVM at the first physical block address, prior to completing an initialization process of the data storage apparatus. The data storage apparatus further includes means for transmitting the data read from the NVM to the host.

Another aspect of the present disclosure provides a data storage apparatus. The apparatus includes a non-volatile memory (NVM), a volatile memory, and a host command handler, an LBA locator, a NVM reader, and a host transmitter. The volatile memory is configured to store a fast boot-up table including a plurality of entries, and each entry includes a logical block address (LBA). The host command handler is configured to receive a first read command from a host after an ungraceful shutdown (UGSD) event of the data storage apparatus. The LBA locator is configured to locate an entry in the fast boot-up table having an LBA indicated by the first read command. The NVM reader is configured to read data associated with the LBA from the NVM prior to completing an initialization process of the data storage apparatus. The host transmitter is configured to transmit the data read from the NVM to the host.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring now to the drawings, embodiments of systems and methods are disclosed for reducing boot-up time of a solid state device (SSD) after an ungraceful shutdown (UGSD) event of the SSD. In one aspect, after the UGSD event, the SSD controller receives a first read command from a host, where the first read command includes a request to read data from a logical block address (LBA). The SSD may reduce boot-up time by using a fast boot-up table for translating certain frequently used logical block addresses (such as the LBA received by the SSD controller) to physical block addresses before the SSD can reconstruct a complete logical-to-physical (L2P) mapping table during an initialization procedure. The fast boot-up table may contain a subset of the entries in the L2P mapping table. The fast boot-up table is maintained independently from the LP2 mapping table, and is synchronized or backed up to the NVM as soon as possible. After UGSD, the SSD controller may check the fast boot-up table for the LBA of a first read command from a host. If the LBA is not in the fast boot-up table, the controller may perform the boot-up process using the L2P table after completing the initialization process.

SSD boot-up time may be a major constraint on SSD performance. In operation, an SSD may have various data stored in its cache and/or volatile memory that get flushed or copied to non-volatile or flash memory over time for persistent storage. An SSD generally writes data at the granularity of a page. However, the timing for execution of write requests from a host may need to be flexible in order to maximize capacity and reduce wear of memory cells. In some examples, the SSD may defer processing of write requests in order to improve performance and wear efficiency. In one such case, the SSD may send an acknowledgment of write requests to the host prior to actually writing the data to SSD's non-volatile storage. The acknowledgment informs the host that the data associated with the write request has been written to the SSD. When an UGSD event occurs, the state of the SSD as acknowledged to the host, in one possible scenario, is not correct because the SSD did not complete the processes for writing the data to the non-volatile storage and updating the L2P mapping table before the UGSD event. Embodiments of the present disclosure enable the SSD to respond to a first host command after an UGSD event but before the SSD has completed the processes for restoring the SSD status and context, including for example, the process of updating the L2P mapping table. Enabling the SSD to respond in this way increases SSD efficiency.

Figure 1:
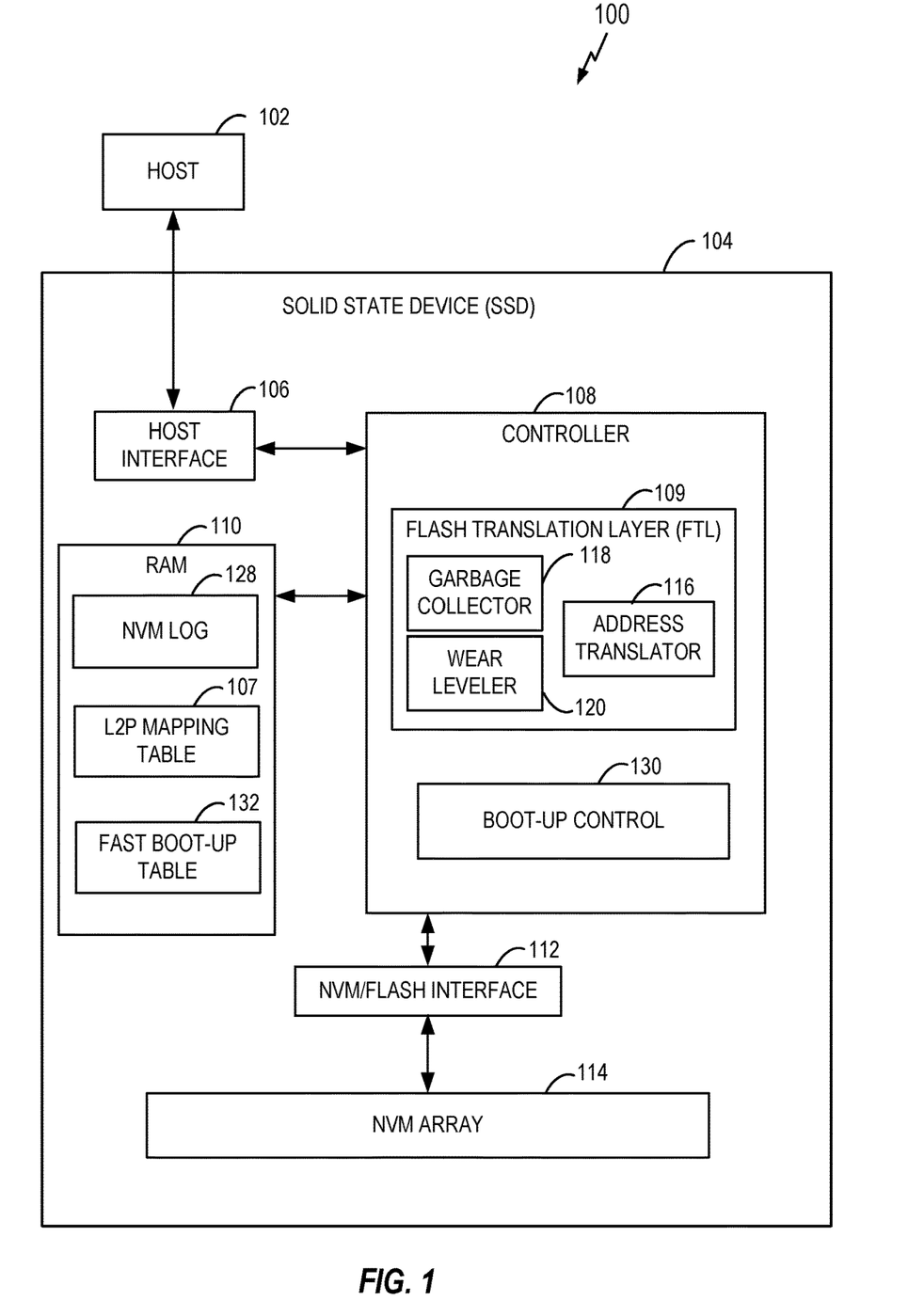
FIG. 1 is a block diagram of a system including an exemplary solid state device (SSD) in accordance with aspects of the disclosure.

FIG. 1 is a block diagram of a system 100 including an exemplary solid state device (SSD) in accordance with aspects of the disclosure. The system 100 includes a host device 102 and an SSD 104 coupled to the host device 102. The host device 102 (or host) provides commands to the SSD 104 for transferring data between the host device 102 and the SSD 104. For example, the host device 102 may provide a write command to the SSD 104 for writing or programming data to the SSD 104 or read command to the SSD 104 for reading data from the SSD. The host device 102 may be any system or device having a need for data storage or retrieval and a compatible interface for communicating with the SSD 104. For example, the host device 102 may be a computing device, a personal computer, a portable computer, a workstation, a server, a personal digital assistant, a smartphone, a digital camera, or a digital phone as merely a few examples.

The SSD 104 includes a host interface 106, a controller 108 (or alternatively, an NVM or SSD controller 108), which also includes a flash translation layer (FTL) 109, a random access memory (RAM) 110, a non-volatile memory (NVM) interface 112 (which may also be referred to as a Flash memory interface), and a non-volatile memory (NVM or NVM device) 114, such as a NAND Flash memory array, for example. The host interface 106 is coupled to the controller 108 and facilitates communication between the host device 102 and the controller 108. Additionally, the controller 108 is coupled to the RAM 110 as well as the NVM 114 via the NVM interface 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, NVM Express (NVMe), or the like. In some embodiments, the host device 102 includes the SSD 104 as a component. In other embodiments, the SSD 104 is remote with respect to the host device 102 or is contained in a remote computing system communicatively coupled with the host device 102.

For example, the host device 102 may communicate with the SSD 104 through a wireless communication link like a Wi-Fi or cellular connection.

The controller 108 controls operation of the SSD 104. In various aspects, the controller 108 receives commands from the host device 102 through the host interface 106 and performs the commands to transfer (e.g., read and/or write) data between the host device 102 and the NVM 114. Furthermore, the controller 108 may manage reading from and writing data to memory 110 for performing the various functions effected by the controller and to maintain and manage cached information stored in memory 110.

The controller 108 may be implemented by any type of processing devices, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 may instead be performed by the host device 102. In still further aspects, some or all of the functions described herein as being performed by the controller 108 may instead be performed by another element such as a controller in a hybrid drive including both non-volatile memory elements and magnetic storage elements. In one aspect, controller 108 can be a special purpose controller specifically configured/programmed to perform any of the functions contained within the application.

The RAM 110 may be any memory, computing device, or system capable of storing data. For example, the memory 110 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), non-volatile random access memory, or the like. In various aspects of the disclosure, the controller 108 uses the RAM 110, or a portion thereof, to store data during the transfer of data between the host device 102 and the NVM 114. For example, the memory 110 or a portion of the memory 110 may be used as a cache memory.

The NVM 114 receives data from the controller 108 via the NVM interface 112 and stores the data for persistence storage. The NVM 114 may be any type of non-volatile memory, such as a flash storage system, a NAND-type flash memory, a solid state device, a flash memory card, a universal serial bus (USB) memory device, a flash storage array, or the like.

In the example of FIG. 1, host requests or commands may generally comprise a request from the host device 102 via the host interface 106 to read the data within a given logical block address (LBA) associated with the NVM 114. Each LBA is associated with a specific physical block address within the NVM 114 through the use of an L2P mapping table maintained by the controller 108, and more particularly by the FTL 109. The L2P mapping table 107 may be stored in the RAM 110 and backed up in the NVM 114 at a predetermined interval or event (e.g., graceful shutdown). In general, the L2P mapping table maps each logical block address to a physical block address within the NVM 114. The use of logical block addresses and a logical-to-physical block address conversion allows the controller 108 to effectively manage the memory within the NVM 114 and to implement various mapping mechanisms.

In a further aspect, the SSD controller 108 may maintain an NVM log 128 for recording accesses to the NVM 114. In some examples, a working copy of the NVM log 128 may be kept in RAM 110 and periodically copied (i.e., flushed) to the NVM array 114 for persistence storage. In some examples, the SSD controller 108 may store a copy of the NVM log 128 to persistent storage, for example, flash memory, magnetoresistive RAM, battery backed-up RAM, or the like.

Figure 2:
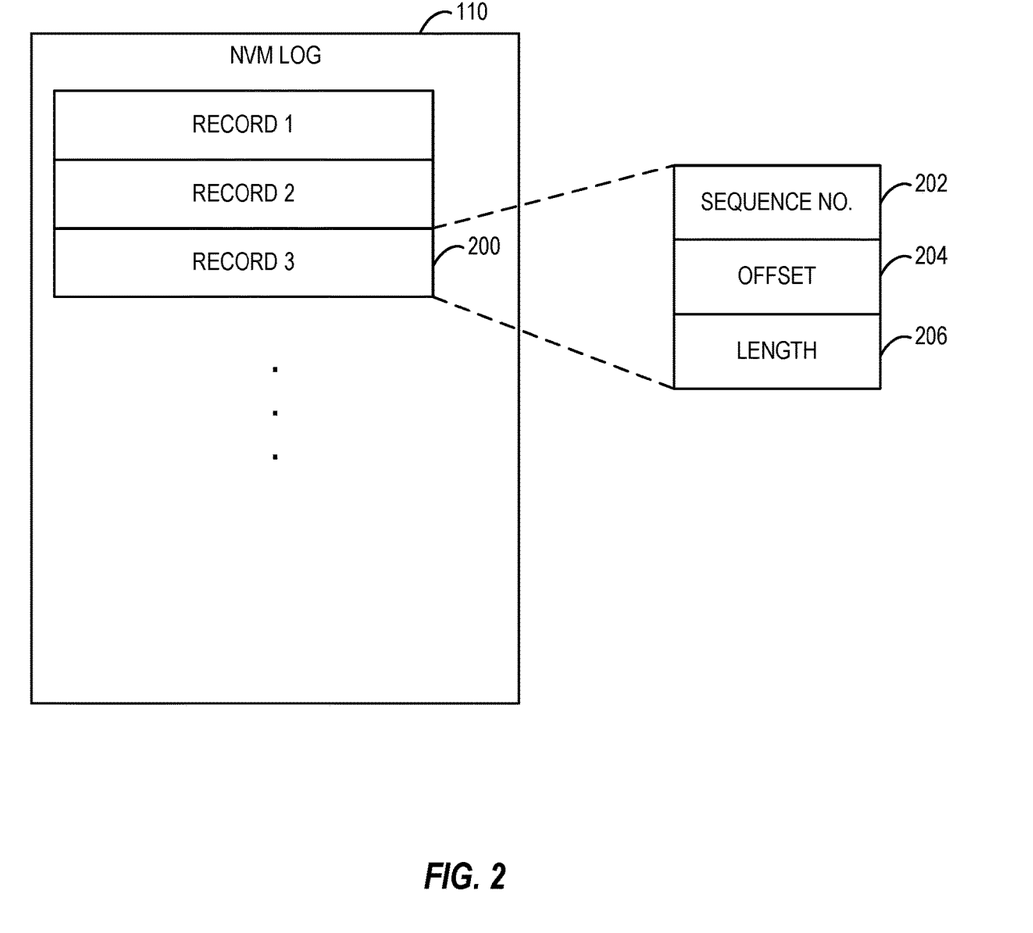
FIG. 2 is a block diagram conceptually illustrating an exemplary NVM log in accordance with aspects of the disclosure.

FIG. 2 is a block diagram conceptually illustrating an exemplary NVM log 128 in accordance with aspects of the disclosure. For each write access to the NVM 114, the SSD controller 108 updates the log 128. The log 128 includes a number of records 200 for keeping track of data stored in the NVM (e.g., NVM array 114). For example, each record 200 may include a sequence number 202, an offset 204, a length 206. In one example, the sequence number may be a time-stamp that indicates the time when data was written to a corresponding block of the NVM. In other examples, the sequence number may be an integer, and the SSD controller 108 may increase or decrease the sequence number for each new write access to the NVM based on a predetermined rule such that the SSD controller 108 can determine the temporal order of the records.

Figure 3:
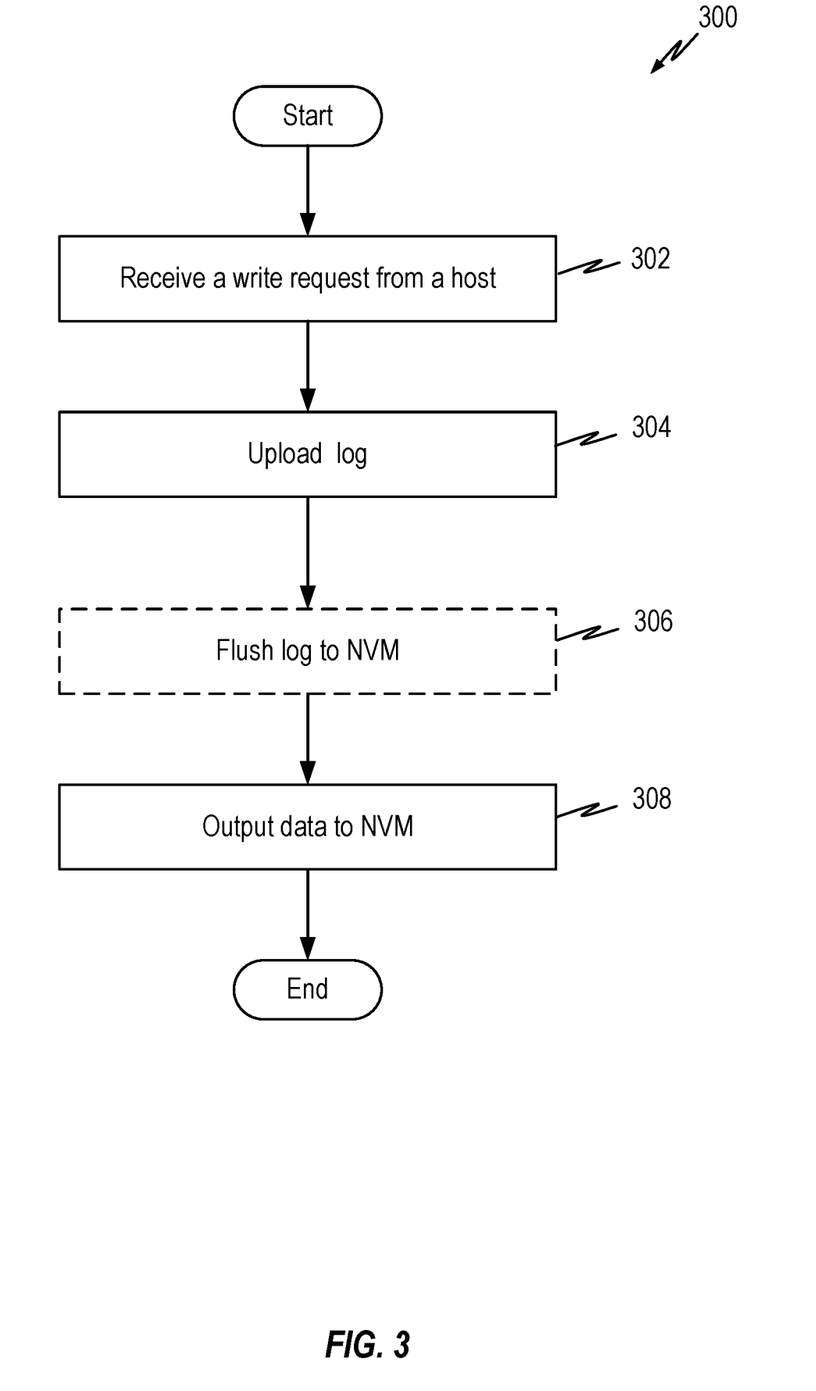
FIG. 3 is a flow chart illustrating a process for handling a write request from a host in accordance with aspects of the disclosure.

FIG. 3 is a flow chart illustrating a process 300 for handling a write request from a host in accordance with aspects of the disclosure. Referring to FIGS. 2 and 3, at block 302, the SSD controller 108 may receive a write request from the host device 102. In some examples, the write request also includes the associated write data. The write request may indicate that the write data is to be written to a certain logical address (e.g., LBA or LBA range). The SSD controller 108 translates the LBA to the corresponding physical block addresses. At block 304, the SSD controller 108 updates the corresponding record(s) in the NVM log 128 associated with the write request. Each record 200 may indicate the physical block addresses (e.g., an offset 204 and a data length 206) for storing the write data. Before the write data is written to the NVM 114, the write data may be temporarily stored in the RAM 110 (e.g., FTL memory). After updating the NVM log, the SSD controller 108, at block 306, may copy or flush the log 128 to the NVM 114 for persistence storage at certain predetermined interval or conditions. After the log 128 is flushed, the SSD controller 108, at block 308, may program or output the write data to the NVM 114. For each write access to the NVM, the controller 108 updates the metadata stored at the NVM to keep track of the write accesses so that after UGSD the controller can use the metadata to reconstruct the log and L2P mapping table.

In a further aspect, the FTL 109 may include an address translator 116 for effecting the translation between logical and physical addresses, as well as to, in part, implement the L2P mapping table. Furthermore, the FTL 109 may include a garbage collector process, module, or algorithm 118 that copies valid data into new or free areas and erases invalid data in physical block locations of the NVM 114 in order to free this invalid memory space. Still further, the FTL 109 may include a wear leveler process, module, or algorithm 120 used to ensure that erasures and re-writes are distributed evenly across the NVM 114.

Figure 4:
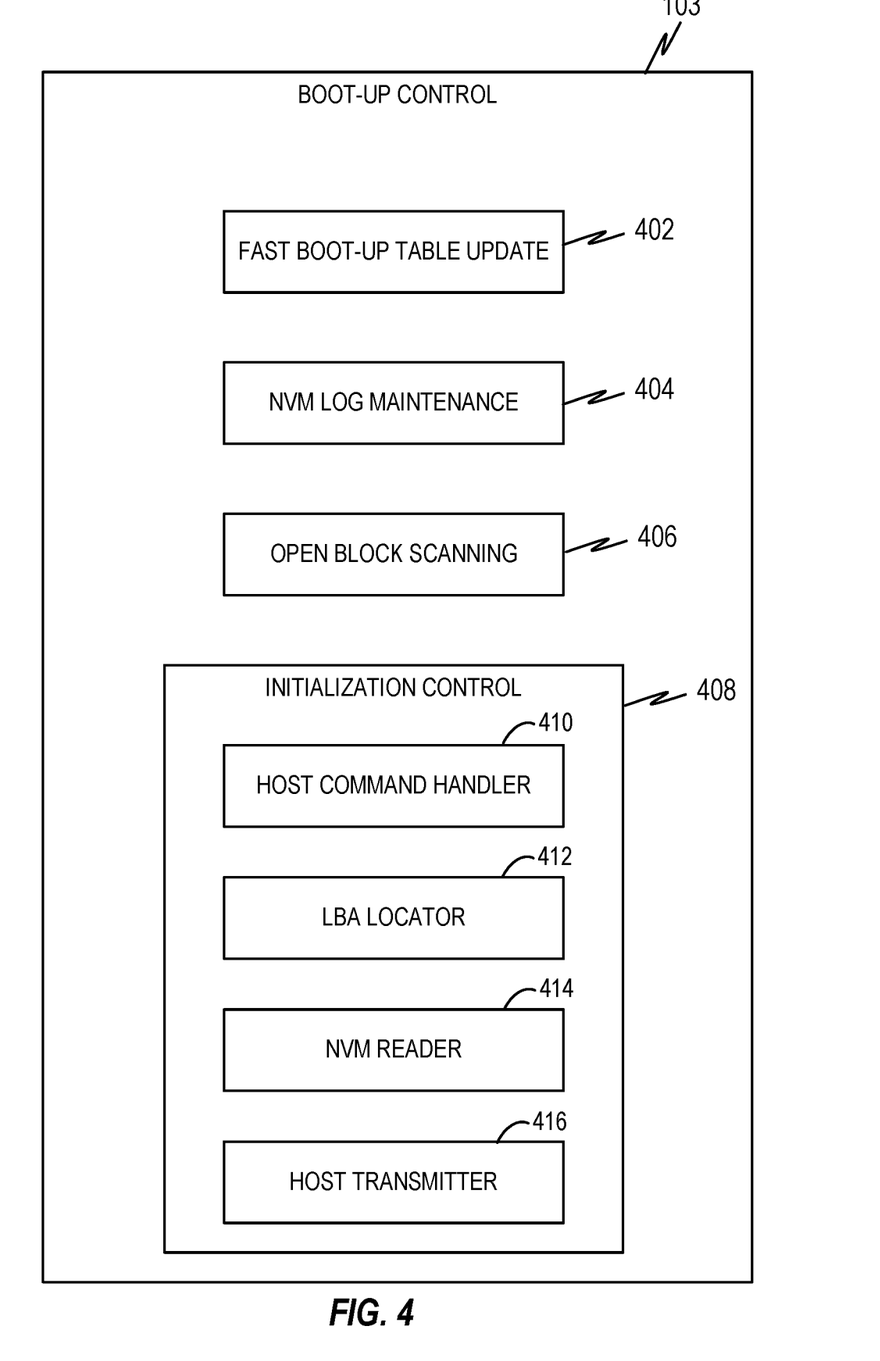
FIG. 4 is a block diagram conceptually illustrating some components of a boot-up control block in accordance with aspects of the disclosure.

In a further aspect, the SSD controller 108 may include a boot-up control block 130 that may be implemented in software, hardware, firmware, or a combination thereof to perform various functions described below for controlling a fast boot-up process of the SSD 104. In one embodiment, referring to FIG. 4, the boot-up control block 130 includes a fast boot-up table update block 402, an NVM log maintenance block 404, an open block scanning block 406, and an initialization control block 408. The fast boot-up table update block 402 may be configured to perform various processes for maintaining a fast boot-up table 132 that may be used to facilitate a fast SSD boot-up process after an ungraceful shutdown (UGSD) event of the SSD. The fast boot-up table 132 may be stored in the RAM 110 and is synchronized with a copy in the NVM 114. The fast boot-up table 312 may contain a subset of the entries in the L2P mapping table 107. After UGSD, the fast boot-up table update block 402 may restore the last saved copy of the fast boot-up table from the NVM 114. The NVM log maintenance block 404 may be configured to perform various processes for maintaining the NVM log 128 as described above in relation to FIG. 3. The open block scanning block 406 may be configured to perform various processes for scanning open blocks of the SSD after UGSD and finding the last good page of each block. The initialization control block 408 may be configured to perform various processed for controlling an initialization process of the SSD after UGSD. Details of these processes will be described in more detail below with illustrative examples in relation to FIGS. 5-9. In one embodiment, the initialization control block 408 may include a host command handler 410, an LBA locator 412, a NVM reader 414, and a host transmitter 416. The host command handler 410 may be configured to receive and process a first command from a host after UGSD. The first read command may be a first read command received from the host 102. The LBA locator may be configured to locate an entry in the fast boot-up table 132 having an LBA indicated by the first read command. The NVM reader 414 may be configured to read data from the NVM 114 indicated by the first read command. The host transmitter 416 may be configured to transmit the data read from the NVM 114 to the host 102, as indicated by the first read command.

Figure 5:
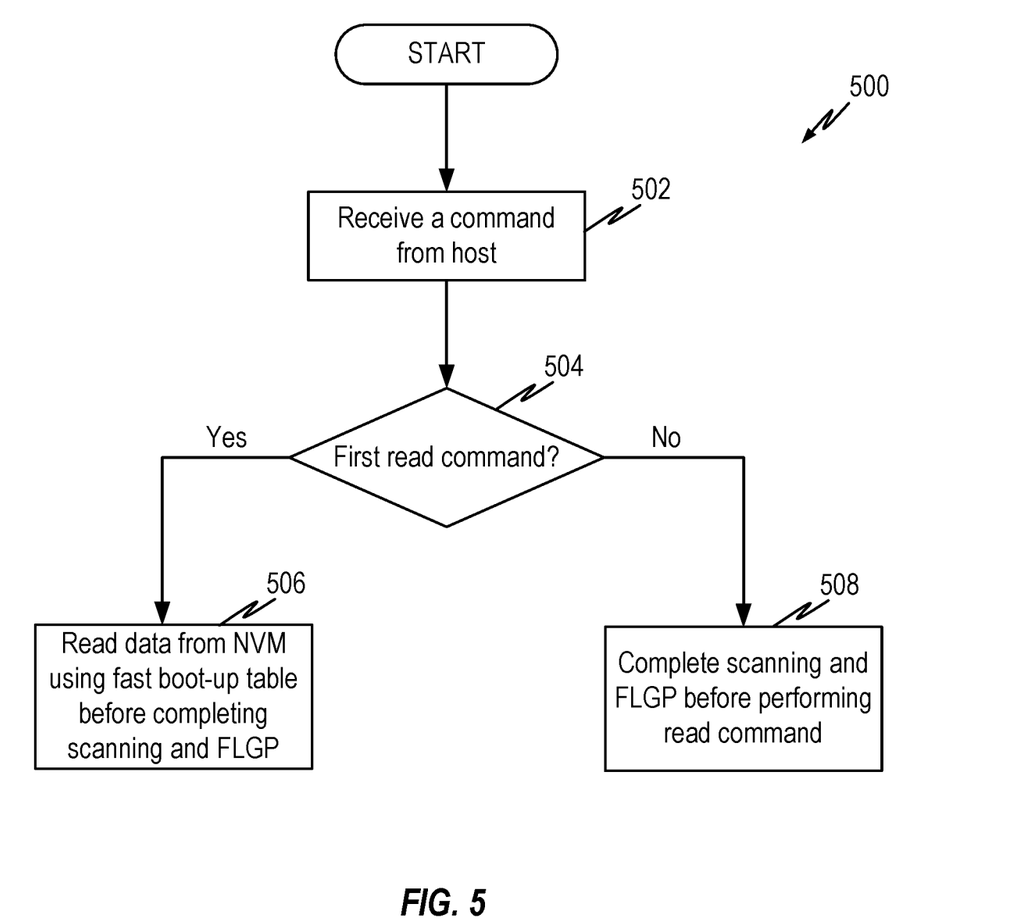
FIG. 5 is a flow chart illustrating an exemplary fast boot-up process of an SSD after ungraceful shutdown in accordance with an aspect of the disclosure.

Aspects of the present disclosure provide various apparatuses, devices, systems and methods for reducing SSD boot-up time, in particular, SSD initialization time after UGSD. FIG. 5 is a flow chart illustrating an exemplary fast boot-up process 500 after UGSD in accordance with an aspect of the disclosure. In general, the host's first command (e.g., read request) to the SSD 104 often happens on a specific set of LBAs. In one aspect of the disclosure, the SSD 104 may store these LBAs in a fast boot-up table 132 (see FIG. 1), which may be an extension of the L2P mapping table of the SSD. The fast boot-up table 132 stores the frequently and/or recently used LBAs and the corresponding physical block addresses. In one example, the fast boot-up table 132 may store about 5 percent of the total LBAs of SSD. For example, if the SSD has 10000 LBAs, the fast boot-up table 312 may have 500 LBA entries. During control synchronization, the SSD controller synchronizes the fast boot-up table to a copy in the NVM 114 or other persistence storage. After UGSD, the SSD controller can retrieve the last saved copy of the fast boot-up table from the NVM, and recreate the fast boot-up table 132 in the RAM 110. Whenever a write request happens on any LBAs in the fast boot-up table, the controller performs control synchronization after the write request is completed to make sure that the SSD can provide the correct data for future read commands on the LBAs of the boot-up table. Because the fast boot-up table is not likely to be updated very frequently, the SSD controller does not need to perform control synchronization frequently to keep the copy of the fast boot-up table up to date in the NVM. After any UGSD, the SSD controller can retrieve the fast boot-up table 132 from the NVM 114 for use in the initialization process.

Referring to FIG. 5, at block 502, the SSD controller 108 receives a command from the host 102 after UGSD. At decision block 504, the SSD controller 108 determines whether the received command is the first read command. At block 506, if the command is a first read command, the SSD controller 108 may read data from the NVM using the LBAs in the fast boot-up table 132 before or while the SSD controller 108 completes the initialization process, for example, including scanning open blocks and finding the last good page. In some examples, if the LBA of the first read command is not found in the fast boot-up table, the SSD controller 108 may complete the processes for scanning the open blocks and finding the last good page (FLGP) before performing the first read command.

At block 508, if the first command is not a first read command (e.g., a second read command or subsequent read commands), the SSD controller 108 completes the initialization processes for scanning and FLGP among the open blocks before performing the host command. Bypassing the scanning and FLGP processes for the first read command reduces the SSD initialization time, and the SSD may respond to the host's first read command faster regardless of the time needed to complete SSD initialization (e.g., scanning and FLGP). For subsequent host commands, the host may wait for the SSD to complete the initialization processes.

Figure 6:
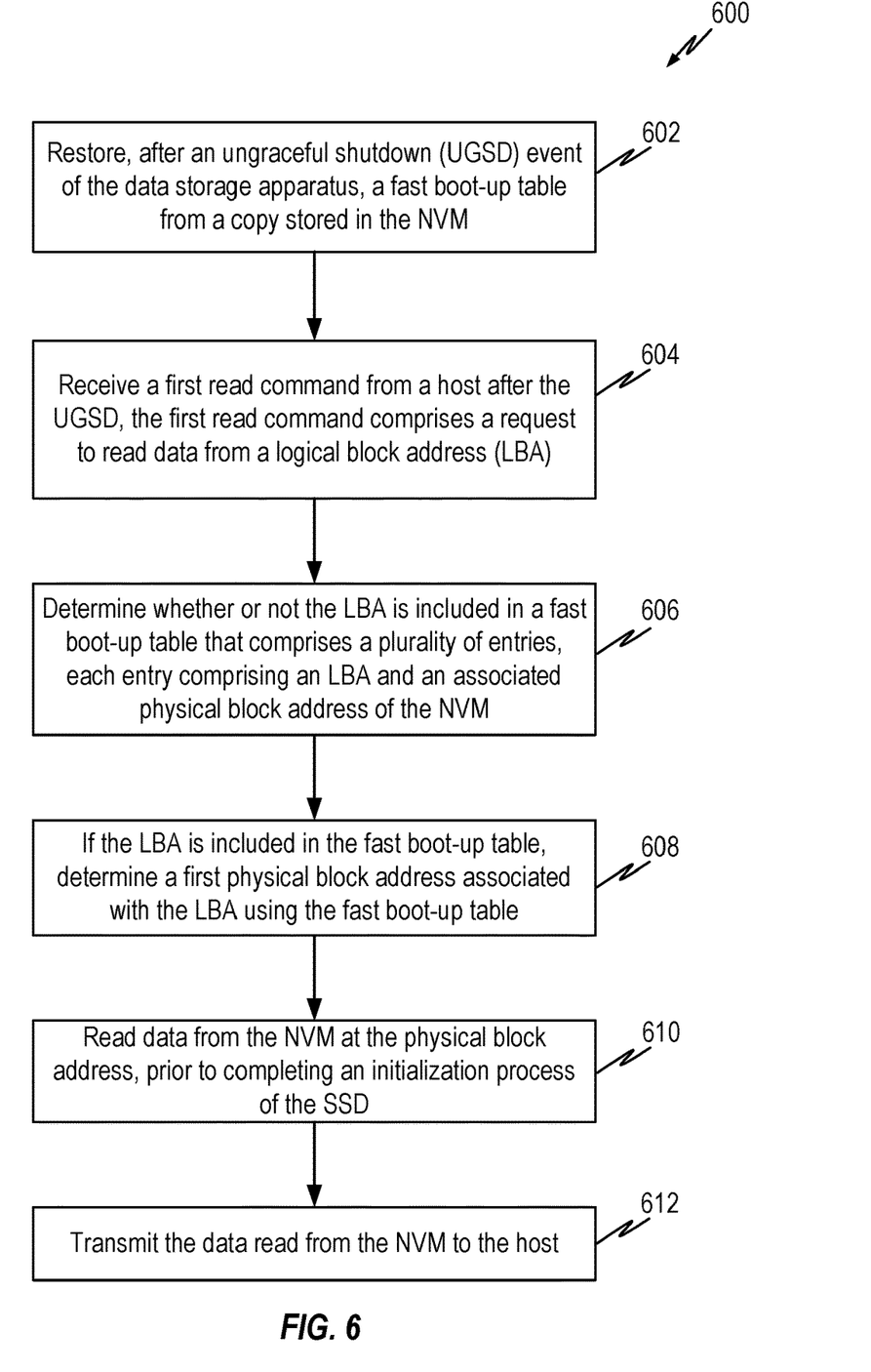
FIG. 6 is a flow chart illustrating an exemplary method for booting an SSD after ungraceful shutdown in accordance with an aspect of the disclosure.

FIG. 6 is a flow chart illustrating an exemplary method 600 for booting an SSD after UGSD in accordance with an aspect of the disclosure. The method 600 may be operated using the SSD 104 described above or any solid state storage system or apparatus. For example, the SSD controller 108 may use method 600 to handle a first read command from a host as described above in FIG. 5.

At block 602, the SSD 104 restores, after a UGSD event of the SSD, a fast boot-up table 132 from a copy stored in the NVM 114. In certain aspects, the block 602 may be effectuated with the controller 108, or with the controller 108 and in combination with the NVM interface 112 as illustrated in FIG. 1. In one aspect, the block 602 may represent one means for restoring a fast boot-up table from a copy stored in the NVM 114.

At block 604, the SSD 104 receives a first read command from a host after the UGSD event. In this example, the first read command may include a request to read data from a logical block address (LBA). In certain aspects, the block 604 may be effectuated with the controller 108, or with the controller 108 and in combination with the host interface 106 as illustrated in FIG. 1. In one aspect, the block 604 may represent one means for receiving the first read command from the host 102 after UGSD of the SSD.

At block 606, the SSD determines whether or not the LBA of the first read command is included in a fast boot-up table that includes a plurality of entries. The fast boot-up table may contain a subset of the entries in an L2P mapping table. Each entry of the fast boot-up table includes an LBA and an associated physical block address of the NVM 114. In certain aspects, the block 606 may be effectuated with the controller 108, for example, the boot-up control block 130 and fast boot-up table 132 as illustrated in FIG. 1. In one aspect, the block 606 may represent one means for determining whether or not the LBA is included in the fast boot-up table.

At block 608, if the LBA is included in the fast boot-up table, the SSD determines or looks up a first physical block address associated with the LBA using the fast boot-up table. In certain aspects, the block 608 may be effectuated with the controller 108, for example, the boot-up control block 130, address translator 116, and fast boot-up table 132 as illustrated in FIG. 1. In one aspect, the block 608 may represent one means for determining the first physical block address associated with the LBA using the fast boot-up table.

At block 610, the SSD reads data from the NVM at the first physical block address, prior to completing an initialization process of the SSD. In certain aspects, the block 610 may be effectuated with the controller 108, or with the controller 108 and in combination with the NVM interface 112 and NVM 114 as illustrated in FIG. 1. In one aspect, the block 610 may represent one means for reading data from the NVM at the first physical block address, prior to completing an initialization process of the SSD.

At block 612, the SSD transmits the data read from the NVM to the host. In certain aspects, the block 612 may be effectuated with the controller 108, or with the controller 108 and in combination with the host interface 106 as illustrated in FIG. 1. In one aspect, the block 612 may represent one means for transmitting the data read from the NVM to the host 102.

The above-described process 600 enables an SSD to perform a fast boot-up process UGSD to provide faster response to a first read command from a host. The SSD can respond to the first read command before SSD initialization is completed.

In a graceful shutdown, the SSD 104 (e.g., SSD controller) receives notification of the impending shutdown/power off and has time to complete any ongoing NVM operations, for example, flushing the NVM log 128, finishing any ongoing writing process to the NVM 114, and updating and saving the L2P mapping table. In an ungraceful shutdown (UGSD) event, like a sudden power loss or power reset without notification to the SSD, the SSD 104 does not have the opportunity to finish its current tasks, for example, flushing its NVM log 128 and completing all ongoing writing processes to the NVM 114. In some cases, flash erasure and/or program operations are not completed or interrupted, resulting in partially erased data blocks or unrecoverable data errors. In another example, the SSD may have acknowledged a write request from a host device but fails to write data to the NVM due to UGSD.

During boot-up after UGSD, the SSD 104 needs to restore all the control blocks and open blocks of the NVM 114 before the SSD is ready for host commands. The control blocks are used for storing control data (e.g., L2P mapping table, NVM log, and fast boot-up table), and the open blocks are blocks that are available for writing new user data. The actual boot-up time is also affected by SSD capacity because when flash physical block size increases, the logical block size also increases, leading to longer boot-up time. It is desirable to reduce the boot-up time of an SSD such that the SSD is ready for executing a first host read command faster after boot-up, in particular, after UGSD.

Figure 7:
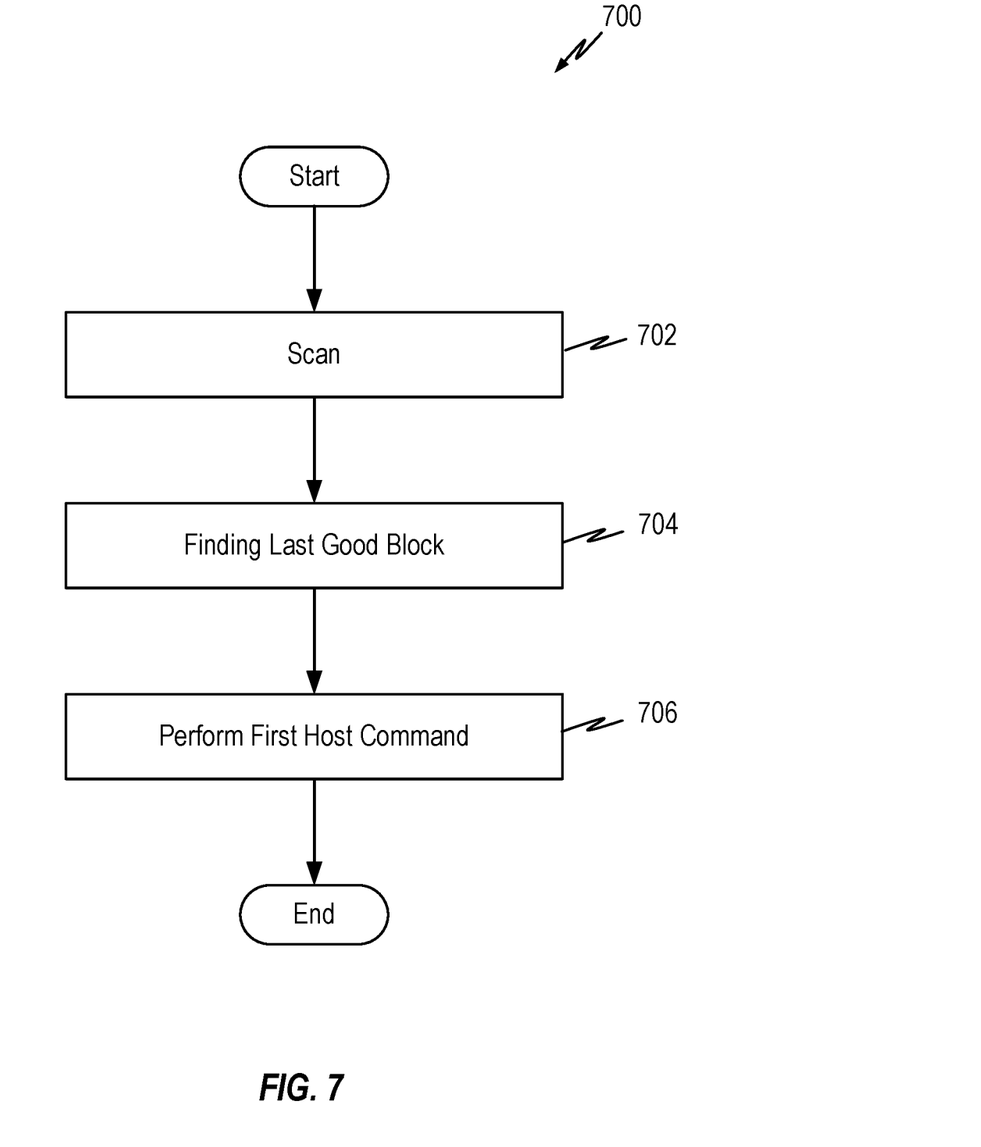
FIG. 7 is a flow chart illustrating an exemplary SSD initialization process in accordance with an aspect of the disclosure.

The total boot-up time for an SSD may include, for example, hardware power-up time and SSD initialization time. FIG. 7 is a flow chart illustrating an exemplary SSD initialization process 700 in accordance with one aspect of the disclosure. In one aspect, the SSD may use the open block scanning block 406 and initialization control block 408 (see FIG. 4) to perform this process 700. After UGSD, SSD initialization includes scanning open blocks 702, finding-last-good-page (FLGP) 704, and executing a first host read commands 706. During the scanning process 702, the SSD controller 108 checks all open blocks of the NVM 114 that are available for new writing requests. For example, the SSD controller 108 may check the last saved NVM log 128 and start scanning pages of an open block corresponding to the previous commit record until the current write offset in each block. In UGSD, the SSD may have acknowledged to the host for a write request that has not be completed by writing the data to the NVM. The SSD controller 108 may check the attributes of each block to determine whether a block is open or not. The block attributes may be a combination of the NVM Log 128 and block metadata.

Figure 8:
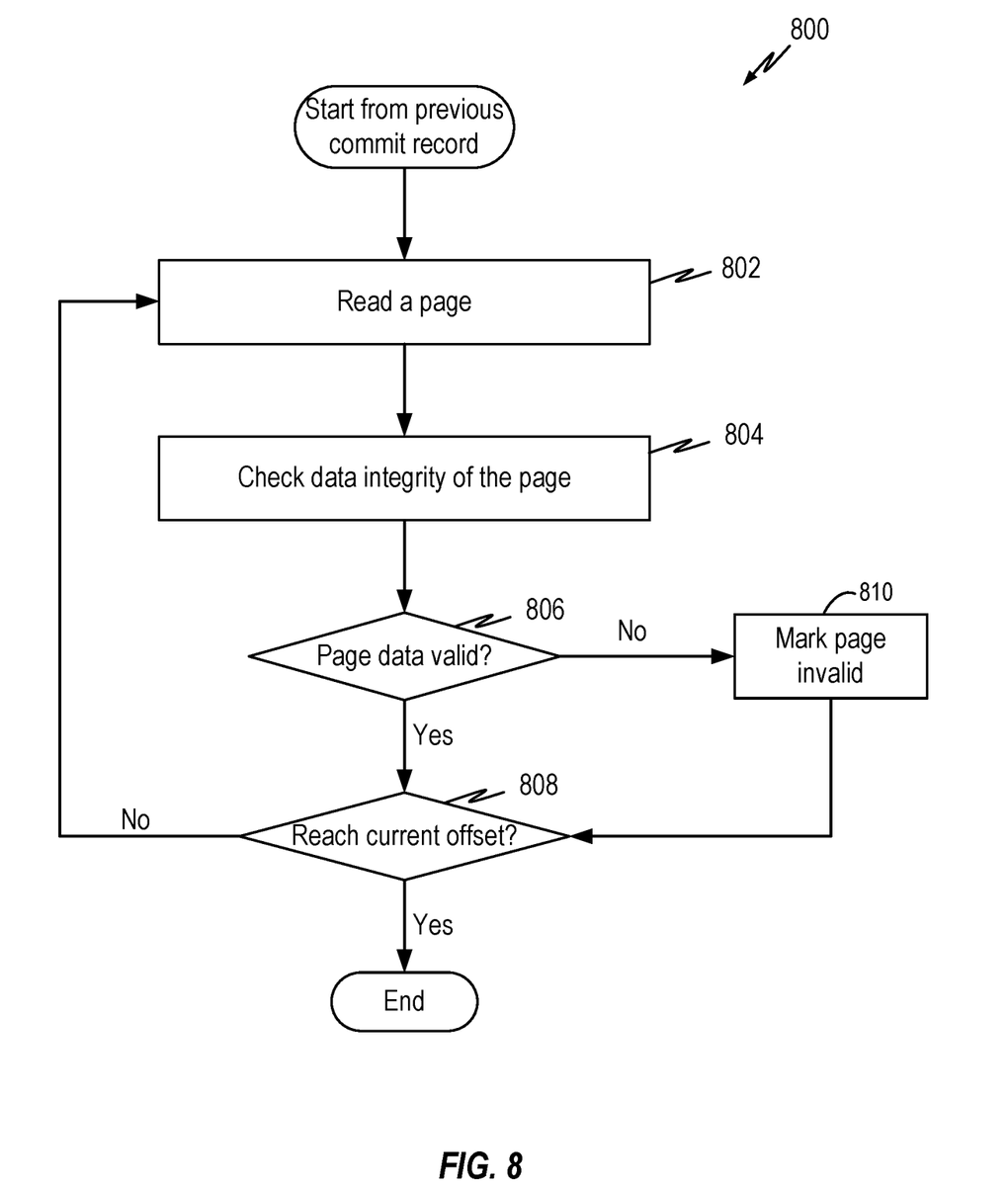
FIG. 8 is a flow chart illustrating an exemplary scanning process of an SSD in accordance with an aspect of the disclosure.

FIG. 8 is a flow chart illustrating an exemplary scanning process 800 in accordance with an aspect of the disclosure. The SSD controller 108 may use the open scanning block 405 to perform this process 800 to find the last good page of an open block. Starting from a previous commit record of an open block, at block 802, the SSD controller 108 may use the NVM interface 112 to read a page from the block. The SSD controller may find the commit record of the block from the NVM log 128. At block 804, the SSD controller checks the data integrity of the page for any uncorrectable error. For example, the SSD controller may check the ECC checksum of the page and/or correct any error found using an error correction code.

At decision block 806, the SSD controller determines whether the page has valid data or not. If the page has no error or correctable errors, the SSD controller 108 may consider the page data as valid (i.e., good page); otherwise, the SSD controller considers the page data as invalid (i.e., page not good). If the page data is valid, at block 808, the SSD controller 108 determines whether the page corresponds to the current written page offset, which may be found in the NVM log. If the current written page offset is reached, the SSD controller may conclude this process for scanning the open blocks. If the current written page offset is not reached yet, the SSD controller continues to scan the next page of the block as described above. Referring back to block 806, if the page data is invalid, at block 810 the SSD controller 108 may mark the page as invalid (i.e., not good page).

Referring back to FIG. 7, at block 704, the SSD controller finds the last good page written to an open block based on the scan results of all open blocks. For example, a page with valid data immediately before a page with invalid data, is the last good page of an open block. After finding the last good page (FLGP), the SSD controller may resynchronize the control data (e.g., L2P mapping table) to map the LBAs to the correct physical block addresses such that the SSD controller may start accepting comments or requests from the host device 102 to access the SSD. At block 706, the SSD controller 108 may perform a first host command (e.g., first read command) received from the host 102. In general, the processes for scanning and FLGP may occur immediately during the boot-up process. In that case, the SSD 104 is not ready for executing host's commands or requests until the initialization processes for scanning and finding the last good page are completed. However, using the fast boot-up processes described above in relation to FIGS. 5 and 6, the SSD controller can handle the host's first read command before completing the scanning and FLGP described above in FIGS. 7 and 8.

Figure 9:
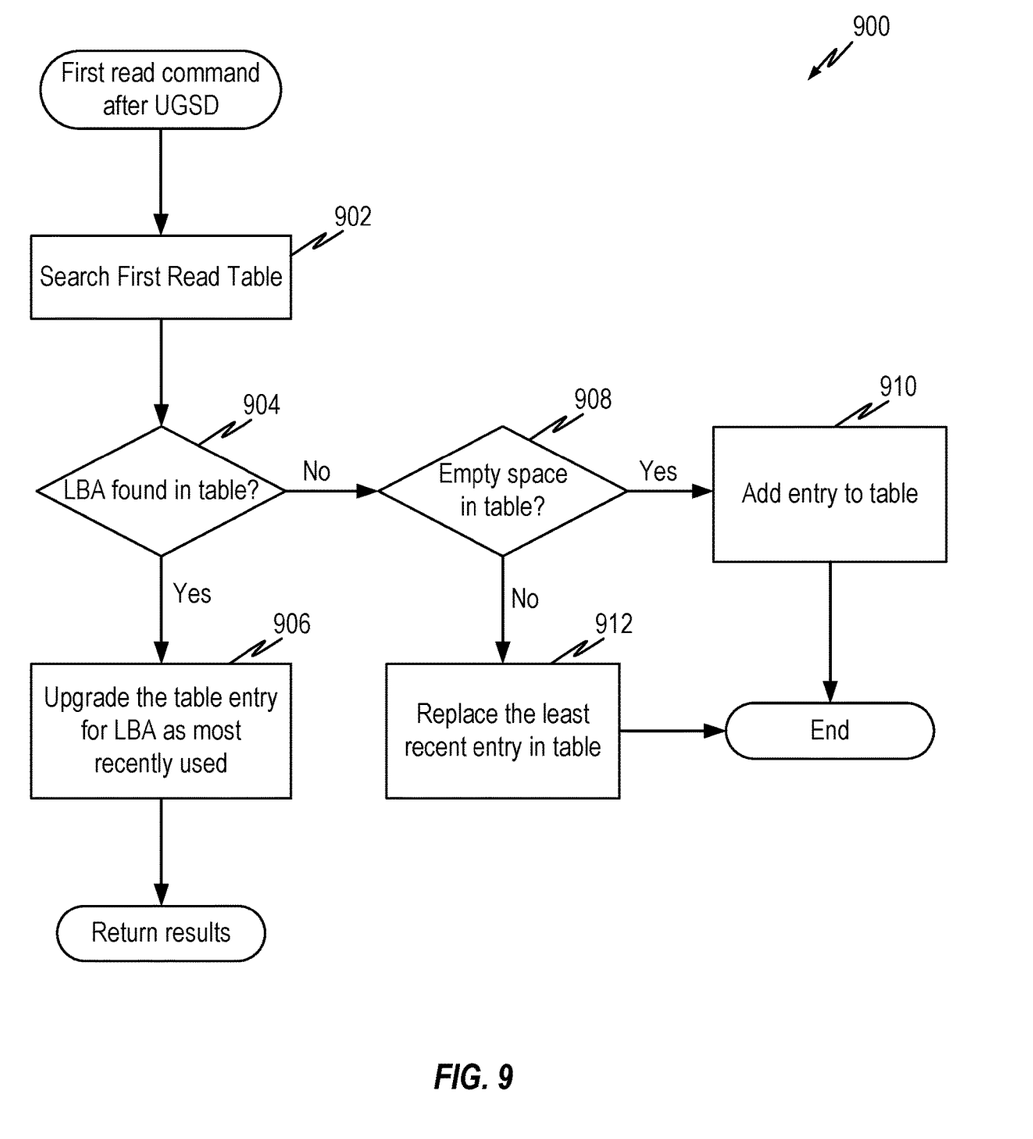
FIG. 9 is a flow chart illustrating an exemplary process for maintaining a fast boot mapping table in accordance with an aspect of the disclosure.

FIG. 9 is a flow chart illustrating an exemplary process 900 for maintaining the fast boot-up table 132 in accordance with an aspect of the disclosure. For example, the SSD controller 108 may use the fast boot-up table update block 402 to perform this process 900 to maintain the fast boot-up table 132 to facilitate the fast boot-up process 500 after UGSD.

At block 902, after receiving a first read command from a host 102, the SSD controller 108 searches the LBA of the first read command in the fast boot-up table 132. At decision block 902, the controller determines whether or not the LBA associated with the first read command is found in the fast boot-up table. At block 906, if the controller found the LBA in the fast boot-up table, the controller may use the fast boot-up table update block 402 to update the fast boot-up table to indicate that the entry for this LBA is most recently used. For example, each entry in the fast boot-up table may have a time stamp, and the controller may update the time stamp of an entry to the current time. Then, the controller may return the results (i.e., reading data from the NVM associated with the LBA) to the host.

At decision block 908, if the LBA of the first read command is not found in the fast boot-up table, the controller determines whether or not the fast boot-up table has empty or unused space for new LBA entry. Initially, the SSD controller may allocate a predetermined amount of storage space for the fast boot-up table. At block 910, if the fast boot-up table has empty space for a new entry, the SSD controller may add a new entry in the table for the LBA associated with the first read command. At block 912, if there is no empty space in the first read table, the SSD controller may replace the least recent or oldest entry in the fast boot-up table with the LBA associated with the first read command. In one example, the SSD controller may locate the least recent entry based on a time stamp of the entry.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A data storage apparatus comprising:
a non-volatile memory (NVM);
a volatile memory configured to store a fast boot-up table comprising a plurality of entries, each entry comprising a logical block address (LBA); and
a controller operatively coupled to the NVM and the volatile memory,
wherein the controller is configured to:
restore, after an ungraceful shutdown (UGSD) event of the data storage apparatus, the fast boot-up table from a copy stored in the NVM;
receive a first read command from a host via a host interface after the UGSD event;
locate an entry in the fast boot-up table having an LBA indicated by the first read command;
read data associated with the LBA from the NVM prior to completing an initialization process of the data storage apparatus; and
transmit the data read from the NVM to the host.

2. The data storage apparatus of claim 1, wherein the controller is further configured to:
during the initialization process, scan open blocks of the NVM to determine a last good page of each open block.

3. The data storage apparatus of claim 1, wherein the controller is further configured to:
receive a second read command from the host after receiving the first read command;
read data from the NVM based on the second read command after completing the initialization process; and
transmit the data read from the NVM to the host.

4. The data storage apparatus of claim 3, wherein the controller is configured to:
translate an LBA of the second read command to a physical block address of the NVM using a logical to physical (L2P) mapping table that is different from the fast boot-up table.

5. The data storage apparatus of claim 1, wherein the controller is further configured to:
determine that no entry in the fast boot-up table matches the LBA indicated by the first read command; and
add an entry to the fast boot-up table for the LBA and an associated physical block address of the NVM.

6. The data storage apparatus of claim 1, wherein the controller is further configured to:
determine that no entry in the fast boot-up table matches the LBA indicated by the first read command; and
replace an oldest entry in the fast boot-up table with a new entry for the LBA and an associated physical block address of the NVM.

7. The data storage apparatus of claim 1, wherein the controller is further configured to:
receive a write command from the host;
write data to the NVM at a physical block address mapped to an LBA indicated by the write command; and
update the fast boot-up table to include an entry for the LBA of the write command.

8. The data storage apparatus of claim 7, wherein the controller is further configured to:
synchronize the fast boot-up table to a copy in the NVM after completing the write command prior to performing further write commands from the host.

9. A method of operating a data storage apparatus comprising a non-volatile memory (NVM), comprising:
restoring, after an ungraceful shutdown (UGSD) event of the data storage apparatus, a fast boot-up table from a copy stored in the NVM;
receiving a first read command from a host after the UGSD event, the first read command comprising a request to read data from a logical block address (LBA);
determining whether or not the LBA is contained in the fast boot-up table that comprises a plurality of entries, each entry comprising an LBA and an associated physical block address of the NVM;
determining, if the LBA is contained in the fast boot-up table, a first physical block address associated with the LBA using the fast boot-up table;
reading data from the NVM at the first physical block address, prior to completing an initialization process of the data storage apparatus; and
transmitting the data read from the NVM to the host.

10. The method of claim 9, further comprising:
if the LBA is not contained in the fast boot-up table, completing the initialization process; and determining a second physical block address associated with the LBA using a logical to physical (L2P) mapping table that is different from the fast boot-up table;
reading data from the NVM at the second physical block address; and
transmitting the data read from the NVM to the host.

11. The method of claim 9, further comprising:
receiving a second read command from the host after receiving the first read command, the second read command comprises a request to read data from an LBA;
determining a second physical block address associated with the LBA of the second read command using a logical to physical (L2P) mapping table that is different from the fast boot-up table;
reading data from the NVM at the second physical block address; and
transmitting the data stored at the second physical block address to the host.

12. The method of claim 9, further comprising:
updating, if no entry in the fast boot-up table matches the LBA indicated by the first read command, the fast boot-up table to include an entry for the LBA, the updating comprising:
adding an entry to the fast boot-up table for the LBA and an associated physical block address of the NVM; or
replacing an oldest entry in the fast boot-up table with a new entry for the LBA and an associated physical block address of the NVM.

13. The method of claim 9, further comprising:
receiving a write command from the host;
writing data to the NVM at a physical block address mapped to an LBA indicated by the write command;
updating the fast boot-up table to include an entry for the LBA of the write command; and
synchronizing the fast boot-up table to a copy in the NVM after completing the write command prior to performing further write commands from the host.

14. A data storage apparatus comprising:
a non-volatile memory (NVM);
means for, after an ungraceful shutdown (UGSD) event of the data storage apparatus, restoring a fast boot-up table from a copy stored in the NVM;
means for receiving a first read command from a host after the UGSD event, the first read command comprises a request to read data from a logical block address (LBA);
means for determining whether or not the LBA is contained in the fast boot-up table that comprises a plurality of entries, each entry comprising an LBA and an associated physical block address of the NVM;
means for, if the LBA is contained in the fast boot-up table, determining a first physical block address associated with the LBA using the fast boot-up table;
means for reading data from the NVM at the first physical block address, prior to completing an initialization process of the data storage apparatus; and
means for transmitting the data read from the NVM to the host.

15. The data storage apparatus of claim 14, further comprising:
means for completing the initialization process comprising scanning open blocks of the NVM and determining a last good page of each open block.

16. The data storage apparatus of claim 14, further comprising:
means for, if the LBA is not contained in the fast boot-up table, completing the initialization process; and
means for determining a second physical block address associated with the LBA using a logical to physical (L2P) mapping table that is different from the fast boot-up table;
means for reading data from the NVM at the second physical block address; and
means for transmitting the data read from the NVM to the host.

17. The data storage apparatus of claim 14, further comprising:
means for receiving a second read command from the host after receiving the first read command, the second read command comprises a request to read data from an LBA;
means for determining a second physical block address associated with the LBA of the second read command using a logical to physical (L2P) mapping table that is different from the fast boot-up table;
means for reading data from the NVM at the second physical block address; and
means for transmitting the data of the second physical block address to the host.

18. The data storage apparatus of claim 14, further comprising:
means for, if no entry in the fast boot-up table matches the LBA indicated by the first read command, adding an entry to the fast boot-up table for the LBA and an associated physical block address of the NVM.

19. The data storage apparatus of claim 14, further comprising:
means for, if that no entry in the fast boot-up table matches the LBA indicated by the first read command, replacing an oldest entry in the fast boot-up table with a new entry for the LBA and an associated physical block address of the NVM.

20. The data storage apparatus of claim 14, further comprising:
means for receiving a write command from the host;
means for writing data to the NVM at a physical block address mapped to an LBA indicated by the write command; and
means for updating the fast boot-up table to include an entry for the LBA of the write command.

21. The data storage apparatus of claim 20, further comprising:
means for synchronizing the fast boot-up table to a copy in the NVM after completing the write command prior to performing further write commands from the host.

22. A data storage apparatus, comprising:
a non-volatile memory (NVM);
a volatile memory configured to store a fast boot-up table comprising a plurality of entries, each entry comprising a logical block address (LBA);
a host command handler configured to receive a first read command from a host after an ungraceful shutdown (UGSD) event of the data storage apparatus;
an LBA locator configured to locate an entry in the fast boot-up table having an LBA indicated by the first read command;
a NVM reader configured to read data associated with the LBA from the NVM prior to completing an initialization process of the data storage apparatus; and
a host transmitter configured to transmit the data read from the NVM to the host.

23. The data storage apparatus of claim 22, further comprising:
   an open block scanner configured to, during the initialization process, scan open blocks of the NVM to determine a last good page of each open block.

24. The data storage apparatus of claim 22, wherein:
   the host command handler is further configured to receive a second read command from the host after receiving the first read command; and
   the NVM reader is further configured to read data from the NVM based on the second read command after completing the initialization process.

25. The data storage apparatus of claim 24, further comprising:
   a flash translation layer configured to translate an LBA of the second read command to a physical block address of the NVM using a logical to physical (L2P) mapping table that is different from the fast boot-up table.

* * * * *